United States Patent
Lin et al.

(10) Patent No.: US 12,354,810 B2
(45) Date of Patent: Jul. 8, 2025

(54) WOUND CAPACITOR PACKAGE STRUCTURE

(71) Applicant: APAQ TECHNOLOGY CO., LTD., Miaoli County (TW)

(72) Inventors: Chieh Lin, Hsinchu County (TW); Chung-Jui Su, Kaohsiung (TW); Cheng-Hao Lu, Miaoli County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 280 days.

(21) Appl. No.: 18/170,536

(22) Filed: Feb. 17, 2023

(65) Prior Publication Data

US 2024/0153708 A1 May 9, 2024

(30) Foreign Application Priority Data

Nov. 9, 2022 (TW) .................................. 111142746

(51) Int. Cl.
*H01G 9/10* (2006.01)
*H01G 9/012* (2006.01)
*H01G 9/15* (2006.01)

(52) U.S. Cl.
CPC ............... *H01G 9/012* (2013.01); *H01G 9/10* (2013.01); *H01G 9/151* (2013.01)

(58) Field of Classification Search
None
See application file for complete search history.

(56) References Cited

U.S. PATENT DOCUMENTS

| | | | |
|---|---|---|---|
| 2004/0100756 A1* | 5/2004 | Koizumi | H01G 9/151 361/509 |
| 2006/0179625 A1* | 8/2006 | Fujimoto | H01G 9/151 29/25.03 |
| 2008/0117567 A1* | 5/2008 | Nakamura | H01G 9/008 361/537 |
| 2010/0165545 A1* | 7/2010 | Fujimoto | H01G 9/028 361/512 |

* cited by examiner

*Primary Examiner* — Eric W Thomas
(74) *Attorney, Agent, or Firm* — Li & Cai Intellectual Property Office

(57) ABSTRACT

A wound capacitor package structure includes a wound assembly, a conductive assembly, a package assembly, a bottom seat plate and a pin protection assembly. The conductive assembly includes a first and a second conductive pin. The package assembly is configured for enclosing the wound assembly. The bottom seat plate is disposed on a bottom side of the package assembly. The pin protection assembly includes a first pin protection layer configured to partially cover the first conductive pin, and a second pin protection layer configured to partially cover the second conductive pin. The first conductive pin includes a first exposed portion exposed outside the package assembly, and the second conductive pin includes a second exposed portion exposed outside the package assembly. The first and the second pin protection layer are disposed on the first and the second exposed portion for protecting the first and the second conductive pin, respectively.

10 Claims, 11 Drawing Sheets

WOUND CAPACITOR PACKAGE STRUCTURE

CROSS-REFERENCE TO RELATED PATENT APPLICATION

This application claims the benefit of priority to Taiwan Patent Application No. 111142746, filed on Nov. 9, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor package structure, and more particularly to a wound capacitor package structure.

BACKGROUND OF THE DISCLOSURE

Capacitors have been widely used in basic components of consumer appliances, computer motherboards, power supplies, communication products, and automobiles. The capacitor has functions including filtering, bypassing, rectifying, coupling, decoupling, switching, etc., and is one of the indispensable components in electronic products. However, the wound capacitors in the prior art still have room for improvement. In particular, when the conductive pins of the capacitor need to be bent, the conductive pins are prone to breakage or cracks at the bends.

SUMMARY OF THE DISCLOSURE

In response to the above-referenced technical inadequacy, the present disclosure provides a wound capacitor package structure for protecting the exposed portions of the conductive pins.

In order to solve the above-mentioned problems, one of the technical aspects adopted by the present disclosure is to provide a wound capacitor package structure, which includes a wound assembly, a conductive assembly, a package assembly, a bottom seat plate and a pin protection assembly. The wound assembly includes a wound positive conductive foil, a wound negative conductive foil and two wound insulating separators. The conductive assembly includes a first conductive pin electrically contacting the wound positive conductive foil and a second conductive pin electrically contacting the wound negative conductive foil. The package assembly is configured for enclosing the wound assembly. The bottom seat plate is disposed on a bottom side of the package assembly for carrying the package assembly. The pin protection assembly includes a first pin protection layer configured to cover a portion of the first conductive pin, and a second pin protection layer configured to cover a portion of the second conductive pin. One of the two wound insulating separators is disposed between the wound positive conductive foil and the wound negative conductive foil, and one of the wound positive conductive foil and the wound negative conductive foil is disposed between the two wound insulating separators. The first conductive pin includes a first embedded portion accommodated inside the package assembly and a first exposed portion exposed outside the package assembly, and the second conductive pin includes a second embedded portion accommodated inside the package assembly and a second exposed portion exposed outside the package assembly. The first exposed portion of the first conductive pin and the second exposed portion of the second conductive pin are exposed from the bottom seat plate, and the first pin protection layer and the second pin protection layer are respectively disposed on the first exposed portion of the first conductive pin and the second exposed portion of the second conductive pin.

In order to solve the above-mentioned problems, another one of the technical aspects adopted by the present disclosure is to provide a wound capacitor package structure, which includes a wound assembly, a conductive assembly, a package assembly, a bottom seat plate and a pin protection assembly. The conductive assembly includes a first conductive pin and a second conductive pin. The package assembly is configured for enclosing the wound assembly. The bottom seat plate is disposed on a bottom side of the package assembly. The pin protection assembly includes a first pin protection layer configured to cover a portion of the first conductive pin, and a second pin protection layer configured to cover a portion of the second conductive pin. The first conductive pin includes a first exposed portion exposed outside the package assembly, and the second conductive pin includes a second exposed portion exposed outside the package assembly. The first exposed portion of the first conductive pin and the second exposed portion of the second conductive pin are exposed from the bottom seat plate, and the first pin protection layer and the second pin protection layer are respectively disposed on the first exposed portion of the first conductive pin and the second exposed portion of the second conductive pin.

In one of the possible or preferred embodiments, the package assembly includes a package casing configured to accommodate the wound assembly and a bottom sealing structure disposed inside the package casing for cooperating with the package casing, and the package assembly is completely enclosed by the package casing and the bottom sealing structure. The bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate.

In one of the possible or preferred embodiments, when the first exposed portion of the first conductive pin is bent to form a first bending section and a first extending section connected to the first bending section, the first pin protection layer is configured to surround and cover the first bending section of the first exposed portion of the first conductive pin, so that the first bending section of the first exposed portion of the first conductive pin is protected by the first pin protection layer to avoid breakage or crack. When the second exposed portion of the second conductive pin is bent to form a second bending section and a second extending section connected to the second bending section, the second pin protection layer is configured to surround and cover the second bending section of the second exposed portion of the second conductive pin, so that the second bending section of the second exposed portion of the second conductive pin is protected by the second pin protection layer to avoid breakage or crack. The first pin protection layer is a first post-production spraying layer or a first post-production coating layer, and the second pin protection layer is a second post-production spraying layer or a second post-production coating layer. The first pin protection layer has a first opening for partially exposing the first bending section of the first exposed portion, and the second pin protection layer has a second opening for partially exposing the second bending section of the second exposed portion.

In one of the possible or preferred embodiments, when the first exposed portion of the first conductive pin is bent to form a first bending section and a first extending section connected to the first bending section, an upper side region and a lower side region of the first bending section of the first exposed portion of the first conductive pin respectively form a first upper bending surface and a first lower bending surface, and the first pin protection layer is configured to cover the first upper bending surface and the first lower bending surface of the first bending section, so that the first bending section of the first exposed portion of the first conductive pin is protected by the first pin protection layer to avoid breakage or crack. When the second exposed portion of the second conductive pin is bent to form a second bending section and a second extending section connected to the second bending section, an upper side region and a lower side region of the second bending section of the second exposed portion of the second conductive pin respectively form a second upper bending surface and a second lower bending surface, and the second pin protection layer is configured to cover the second upper bending surface and the second lower bending surface of the second bending section, so that the second bending section of the second exposed portion of the second conductive pin is protected by the second pin protection layer to avoid breakage or crack. The first pin protection layer is a first post-production spraying layer or a first post-production coating layer, and the second pin protection layer is a second post-production spraying layer or a second post-production coating layer.

In one of the possible or preferred embodiments, when the first exposed portion of the first conductive pin has not been bent to define a first prepared bending section and a first extending section connected to the first prepared bending section, the first pin protection layer is configured to surround and cover the first prepared bending section of the first exposed portion of the first conductive pin, so that the first prepared bending section of the first exposed portion of the first conductive pin is protected through the first pin protection layer. When the second exposed portion of the second conductive pin has not been bent to define a second prepared bending section and a second extending section connected to the second prepared bending section, the second pin protection layer is configured to surround and cover the second prepared bending section of the second exposed portion of the second conductive pin, so that the second prepared bending section of the second exposed portion of the second conductive pin is protected through the second pin protection layer. The first pin protection layer is a first post-production spraying layer, a first post-production coating layer, a first prefabricated attachment layer or a first detachable heat-resistant elastic sleeve, and the second pin protection layer is a second post-production spraying layer, a second post-production coating layer, a second prefabricated attachment layer or a second detachable heat-resistant elastic sleeve. The first pin protection layer has a first opening for partially exposing the first prepared bending section of the first exposed portion, and the second pin protection layer has a second opening for partially exposing the second prepared bending section of the second exposed portion.

In one of the possible or preferred embodiments, the package assembly includes a package casing configured to accommodate the wound assembly and a bottom sealing structure disposed inside the package casing for cooperating with the package casing, and the package assembly is completely enclosed by the package casing and the bottom sealing structure. The bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate. The first pin protection layer is a first non-detachable heat-resistant elastic layer or a first detachable heat-resistant elastic sleeve, and the second pin protection layer is a second non-detachable heat-resistant elastic layer or a second detachable heat-resistant elastic sleeve. The first pin protection layer has a first opening for partially exposing the first exposed portion, and the second pin protection layer has a second opening for partially exposing the second exposed portion.

Therefore, in the wound capacitor package structure provided by the present disclosure, by virtue of "the pin protection assembly including a first pin protection layer configured to cover a portion of the first conductive pin, and a second pin protection layer configured to cover a portion of the second conductive pin" and "the first pin protection layer and the second pin protection layer being respectively disposed on the first exposed portion of the first conductive pin and the second exposed portion of the second conductive pin," the first pin protection layer and the second pin protection layer can be configured to respectively protect the first exposed portion of the first conductive pin and the second exposed portion of the second conductive pin.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
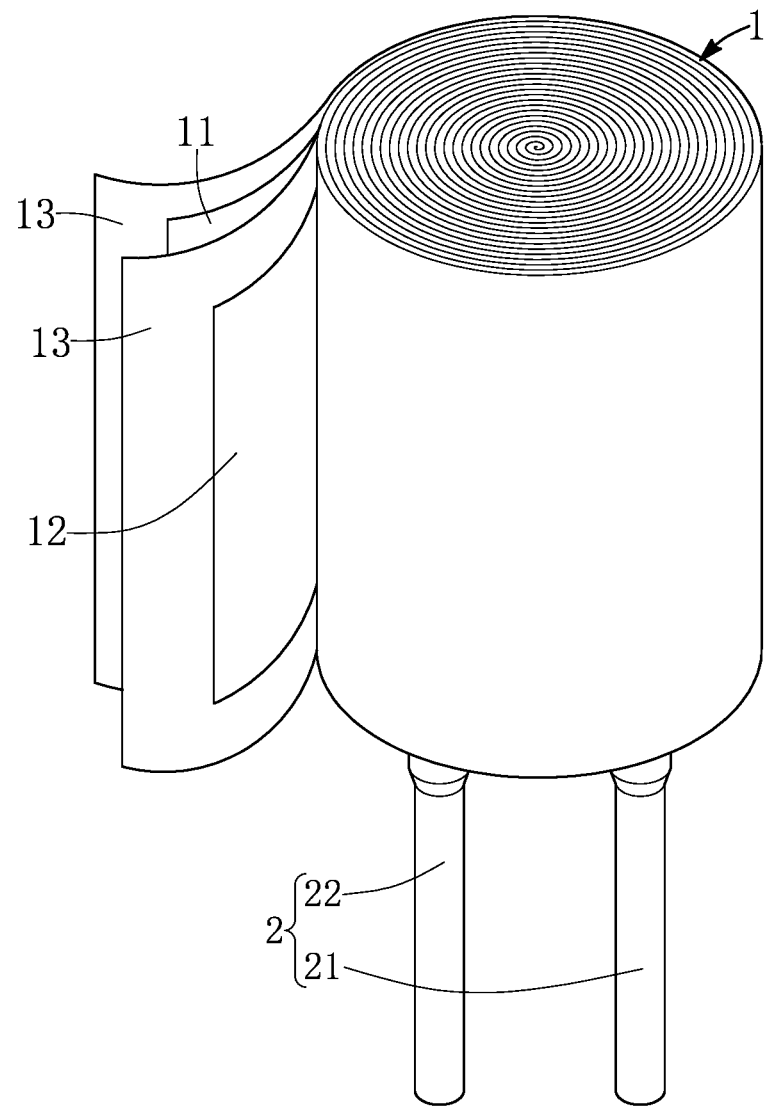
FIG. 1 is a schematic perspective view of the cooperation of a wound assembly and a conductive assembly provided by the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 11, the present disclosure provides a wound capacitor package structure P, which includes a wound capacitor package structure P, which includes a wound assembly 1, a conductive assembly 2, a package assembly 3, a bottom seat plate 4 and a pin protection assembly 5. More particularly, the conductive assembly 2 includes a first conductive pin 21 and a second conductive pin 22. The package assembly 3 can be configured for enclosing the wound assembly 1 (that is to say, the wound assembly 1 is enclosed inside the package assembly 3). The bottom seat plate 4 is disposed on a bottom side of the package assembly 3. The pin protection assembly 5 includes a first pin protection layer 51 configured to cover a portion of the first conductive pin 21, and a second pin protection layer 52 configured to cover a portion of the second conductive pin 22. The first conductive pin 21 includes a first exposed portion 212 exposed outside the package assembly 3, and the second conductive pin 22 includes a second exposed portion 222 exposed outside the package assembly 3. The first exposed portion 212 of the first conductive pin 21 and the second exposed portion 222 of the second conductive pin 22 pass through the bottom seat plate 4 and are exposed outside, and the first pin protection layer 51 and the second pin protection layer 52 are respectively disposed on the first exposed portion 212 of the first conductive pin 21 and the second exposed portion 222 of the second conductive pin 22.

Therefore, in the wound capacitor package structure P provided by the present disclosure, by virtue of "the pin protection assembly 5 including a first pin protection layer 51 configured to cover a portion of the first conductive pin 21, and a second pin protection layer 52 configured to cover a portion of the second conductive pin 22" and "the first pin protection layer 51 and the second pin protection layer 52 being respectively disposed on the first exposed portion 212 of the first conductive pin 21 and the second exposed portion 222 of the second conductive pin 22," the first pin protection layer 51 and the second pin protection layer 52 can be configured to respectively protect the first exposed portion 212 of the first conductive pin 21 and the second exposed portion 222 of the second conductive pin 22, so as to prevent the first conductive pin 21 and the second conductive pin 22 from breaking or cracking during the bending process.

First Embodiment

Figure 2:
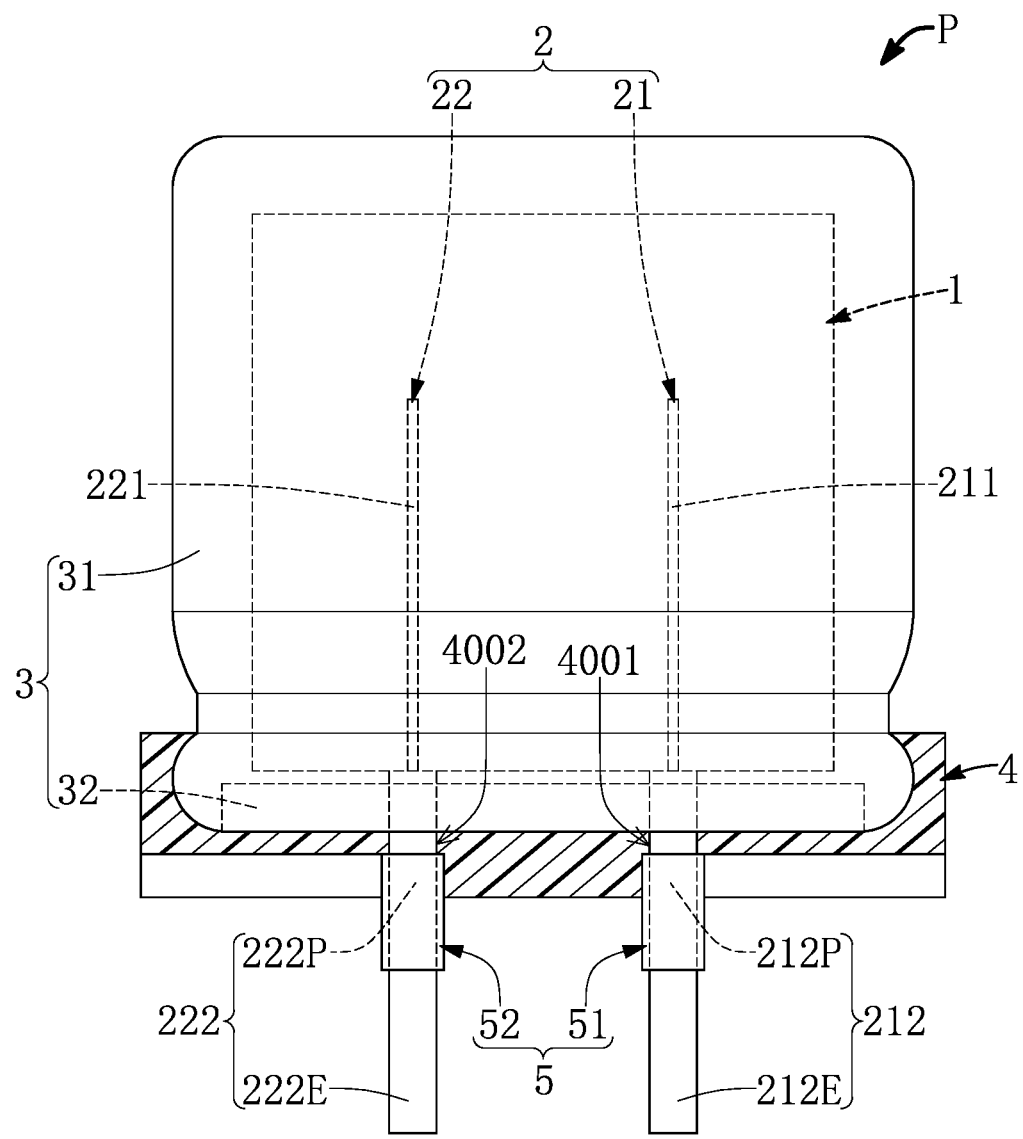
FIG. 2 is a partial schematic cross-sectional view of a wound capacitor package structure provided by a first embodiment of the present disclosure (when a first exposed portion of a first conductive pin and a second exposed portion of a second conductive pin have not been bent)
Figure 3:
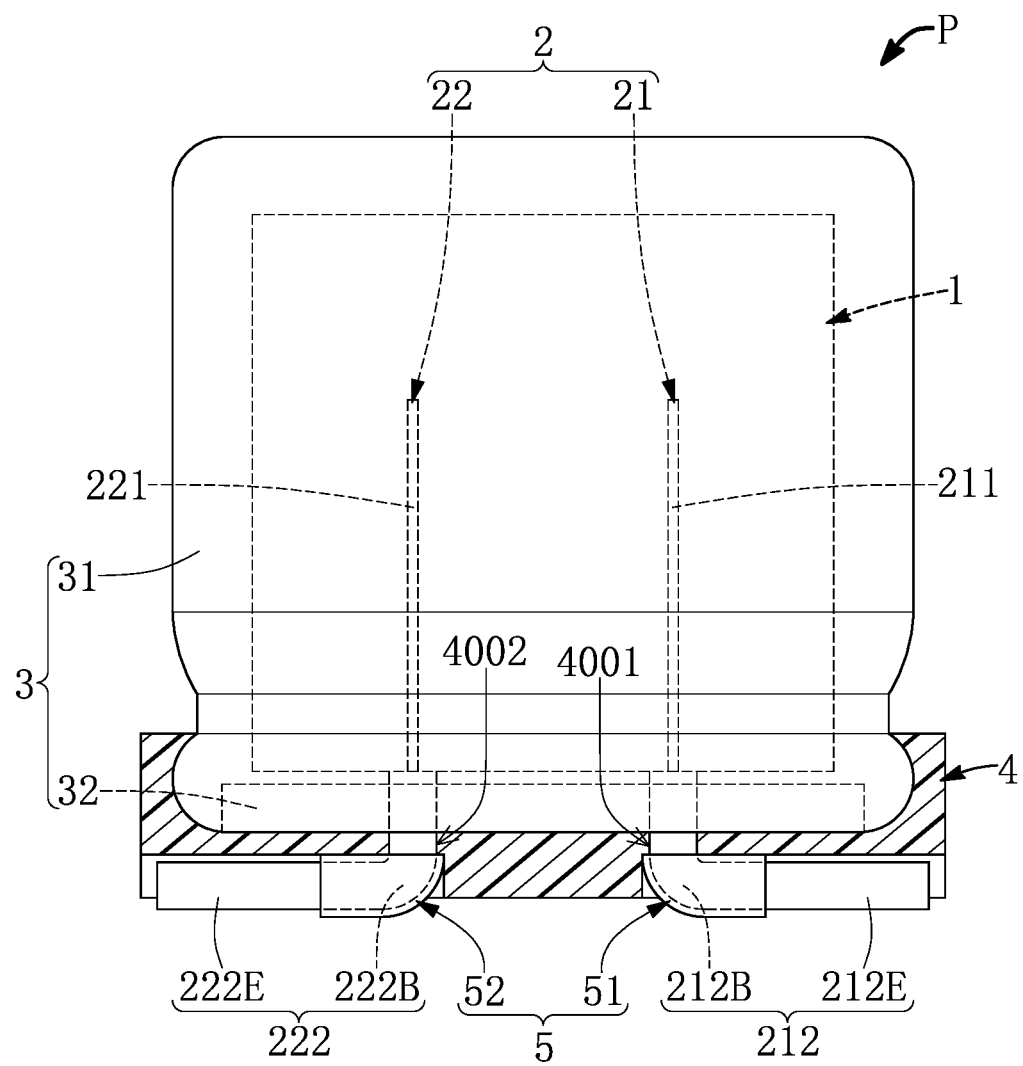
FIG. 3 is a partial schematic cross-sectional view of the wound capacitor package structure provided by the first embodiment of the present disclosure (after the first exposed portion of the first conductive pin and the second exposed portion of the second conductive pin have been bent)

Referring to FIG. 1 to FIG. 3, a first embodiment of the present disclosure provides a wound capacitor package structure P (i.e., a winding-type capacitor package structure), which includes a wound assembly 1, a conductive assembly 2, a package assembly 3, a bottom seat plate 4 and a pin protection assembly 5.

Firstly, as shown in FIG. 1, the wound assembly 1 includes a wound positive conductive foil 11, a wound negative conductive foil 12 and two wound insulating separators 13. More particularly, one of the two wound insulating separators 13 can be disposed between the wound positive conductive foil 11 and the wound negative conductive foil 12, and one of the wound positive conductive foil 11 and the wound negative conductive foil 12 can be disposed between the two wound insulating separators 13 (for example, as shown in FIG. 1, the wound positive conductive foil 11 is disposed between the two wound insulating separators 13). In addition, the wound insulating separator 13 can be an insulating paper or insulating foil containing a dipping material such as conductive polymer. However, the aforementioned details are disclosed for exemplary purposes only, and are not meant to limit the scope of the present disclosure.

Furthermore, referring to FIG. 1 to FIG. 3, the conductive assembly 2 includes a first conductive pin 21 electrically contacting the wound positive conductive foil 11 and a second conductive pin 22 electrically contacting the wound negative conductive foil 12, and the package assembly 3 can be configured for enclosing the wound assembly 1. More particularly, the first conductive pin 21 includes a first embedded portion 211 accommodated inside the package assembly 3 and a first exposed portion 212 exposed outside the package assembly 3, and the second conductive pin 22 includes a second embedded portion 221 accommodated inside the package assembly 3 and a second exposed portion 222 exposed outside the package assembly 3. For example, the package assembly 3 includes a package casing 31 (such as aluminum casing or a casing made of any material) configured to accommodate the wound assembly 1 and a bottom sealing structure 32 (or a bottom enclosing structure) disposed inside the package casing 31 for cooperating with the package casing 31, and the package assembly 3 can be completely enclosed by cooperation of the package casing 31 and the bottom sealing structure 32. However, the aforementioned details are disclosed for exemplary purposes only, and are not meant to limit the scope of the present disclosure.

Moreover, referring to FIG. 1 to FIG. 3, the bottom seat plate 4 is disposed on a bottom side of the package assembly 3 for carrying the package assembly 3, and the pin protection assembly 5 includes a first pin protection layer 51 configured to cover a portion of the first conductive pin 21, and a second pin protection layer 52 configured to cover a portion of the second conductive pin 22. More particularly, the first exposed portion 212 of the first conductive pin 21 and the second exposed portion 222 of the second conductive pin 22 can pass through the bottom seat plate 4 and be exposed out of the bottom seat plate 4, and the first pin protection layer 51 and the second pin protection layer 52 can be respectively disposed on the first exposed portion 212 of the first conductive pin 21 and the second exposed portion 222 of the second conductive pin 22. For example, the bottom seat plate 4 has a first through hole 4001 and a second through hole 4002, and the first conductive pin 21 and the second conductive pin 22 respectively pass through the first through hole 4001 and the second through hole 4002 of the bottom seat plate 4. However, the aforementioned details are disclosed for exemplary purposes only, and are not meant to limit the scope of the present disclosure.

More particularly, as shown in FIG. 2, when the first exposed portion 212 of the first conductive pin 21 has not been bent to define a first prepared bending section 212P (i.e., a first unbent section) and a first extending section 212E connected to the first prepared bending section 212P, the first pin protection layer 51 can be configured to surround and cover the first prepared bending section 212P of the first exposed portion 212 of the first conductive pin 21, so that the first prepared bending section 212P of the first exposed portion 212 of the first conductive pin 21 can be protected through the first pin protection layer 51. Moreover, when the second exposed portion 222 of the second conductive pin 22 has not been bent to define a second prepared bending section 222P (i.e., a second unbent section) and a second extending section 222E connected to the second prepared bending section 222P, the second pin protection layer 52 can be configured to surround and cover the second prepared bending section 222P of the second exposed portion 222 of the second conductive pin 22, so that the second prepared bending section 222P of the second exposed portion 222 of the second conductive pin 22 can be protected through the second pin protection layer 52. For example, the first pin protection layer 51 can be a first detachable heat-resistant elastic sleeve, and the second pin protection layer 52 can be a second detachable heat-resistant elastic sleeve. That is to say, the first pin protection layer 51 and the second pin protection layer 52 can be prefabricated, and the first pin protection layer 51 and the second pin protection layer 52 can be respectively disposed around the first conductive pin 21 and the second conductive pin 22 (or the first conductive pin 21 and the second conductive pin 22 respectively pass through the first pin protection layer 51 and the second pin protection layer 52), so that the first pin protection layer 51 and the second pin protection layer 52 can be respectively sleeved around the first prepared bending section 212P of the first conductive pin 21 and the second prepared bending section 222P of the second conductive pin 22. It should be noted that the first pin protection layer 51 can also be a first prefabricated attachment layer, and the second pin protection layer 52 can also be a second prefabricated attachment layer. That is to say, the first pin protection layer 51 (for example, the first pin protection layer 51 can be composed of a plurality of first adhesive layers) and the second pin protection layer 52 (for example, the second pin protection layer 52 can be composed of a plurality of second adhesive layers) can be adhered to the first prepared bending section 212P of the first conductive pin 21 and the second prepared bending section 222P of the second conductive pin 22 through any adhesive materials. However, the aforementioned details are disclosed for exemplary purposes only, and are not meant to limit the scope of the present disclosure.

More particularly, when the first exposed portion 212 of the first conductive pin 21 is bent to form a first bending section 212B (obtained by bending the first prepared bending section 212P) and a first extending section 212E connected to the first bending section 212B, the first pin protection layer 51 can be configured to surround and cover the first bending section 212B of the first exposed portion 212 of the first conductive pin 21, so that the first bending section 212B of the first exposed portion 212 of the first conductive pin 21 can be protected by the first pin protection layer 51 to avoid breakage or crack. Moreover, when the second exposed portion 222 of the second conductive pin 22 is bent to form a second bending section 222B (obtained by bending the second prepared bending section 222P) and a second extending section 222E connected to the second bending section 222B, the second pin protection layer 52 can be configured to surround and cover the second bending section 222B of the second exposed portion 222 of the second conductive pin 22, so that the second bending section 222B of the second exposed portion 222 of the second conductive pin 22 can be protected by the second pin protection layer 52 to avoid breakage or crack. However, the aforementioned details are disclosed for exemplary purposes only, and are not meant to limit the scope of the present disclosure.

Second Embodiment

Figure 4:
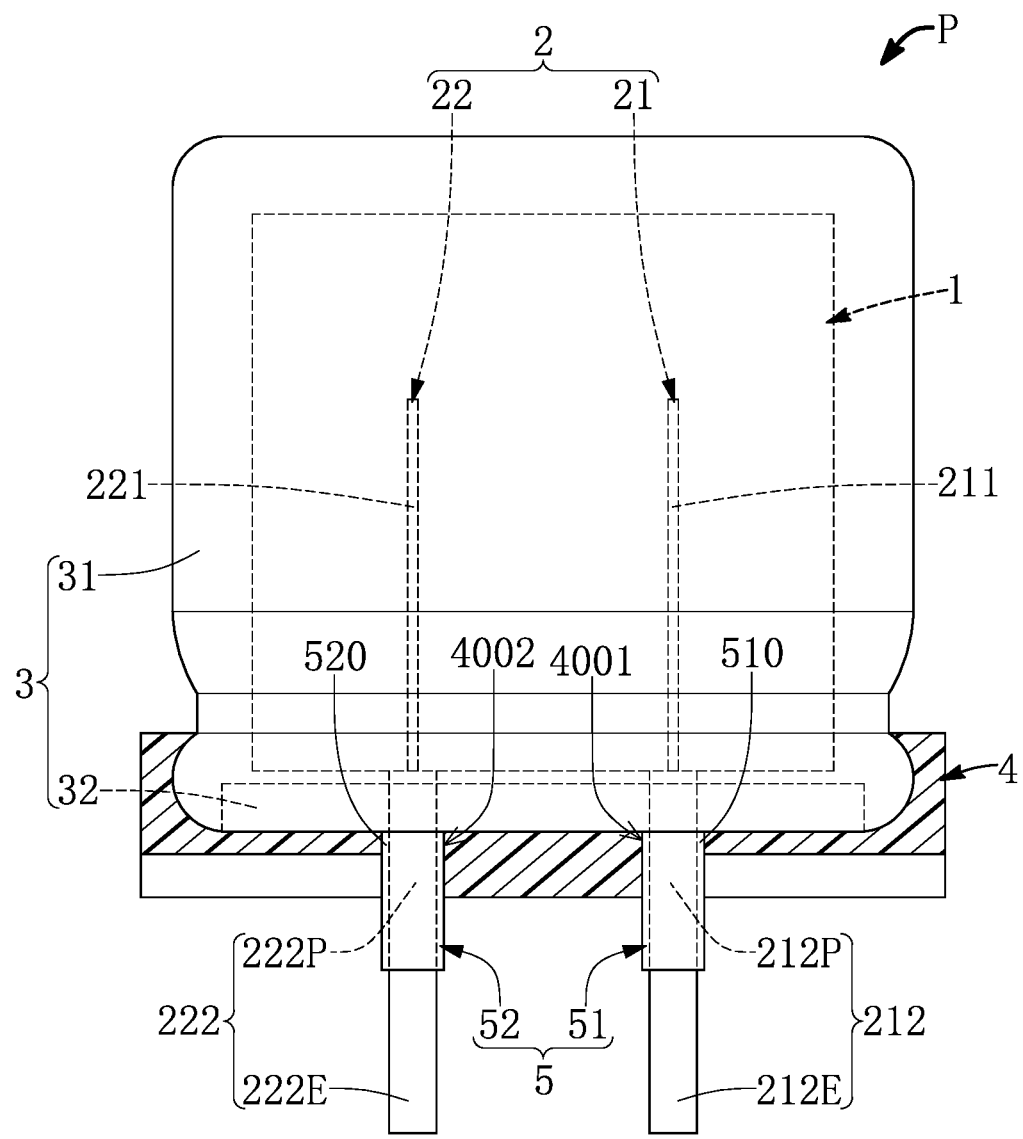
FIG. 4 is a partial schematic cross-sectional view of the wound capacitor package structure provided by a second embodiment of the present disclosure (when the first exposed portion of the first conductive pin and the second exposed portion of the second conductive pin have not been bent)
Figure 5:
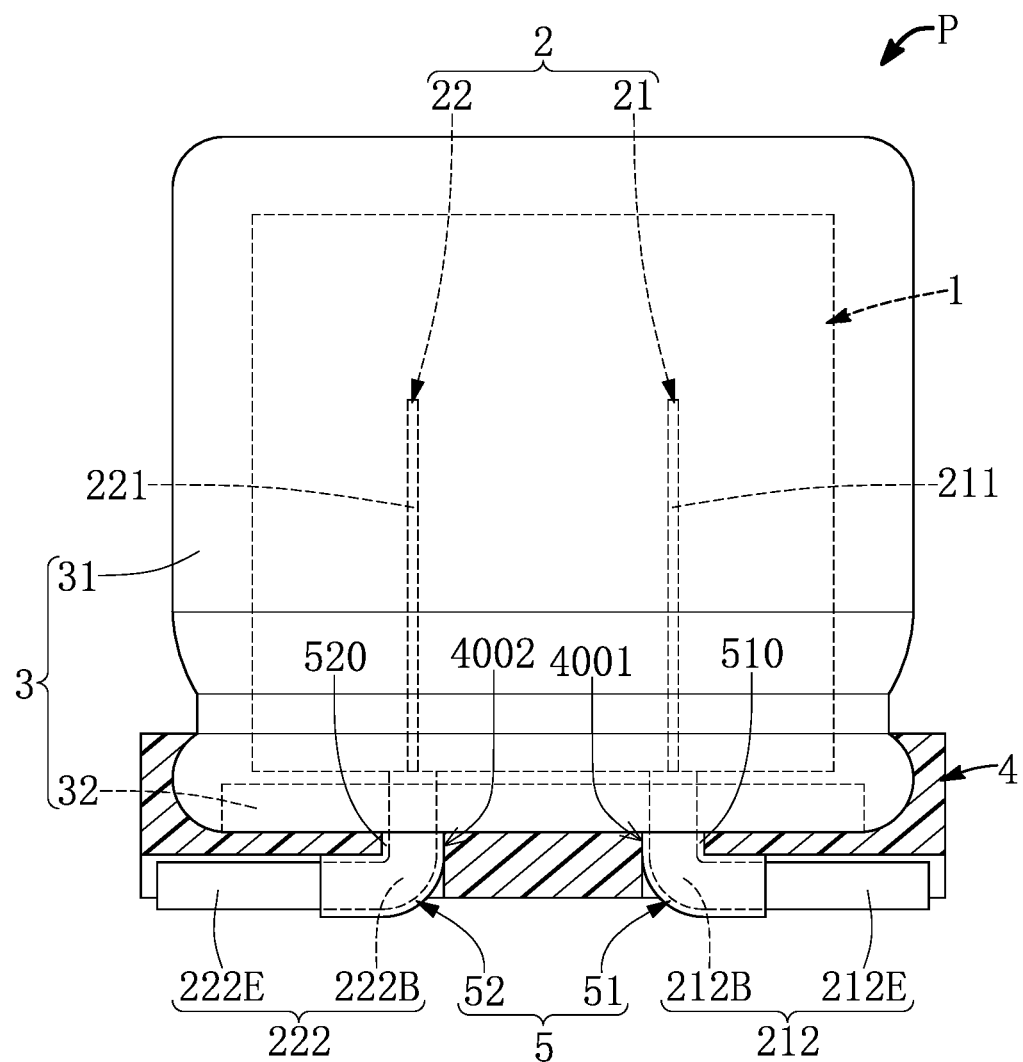
FIG. 5 is a partial schematic cross-sectional view of the wound capacitor package structure provided by the second embodiment of the present disclosure (after the first exposed portion of the first conductive pin and the second exposed portion of the second conductive pin have been bent)

Referring to FIG. 4 and FIG. 5, a second embodiment of the present disclosure provides a wound capacitor package structure P, which includes a wound assembly 1, a conductive assembly 2, a package assembly 3, a bottom seat plate 4 and a pin protection assembly 5. Comparing FIG. 4 with FIG. 2, and comparing FIG. 5 with FIG. 3, the main difference between the second embodiment and the first embodiment is as follows: in the second embodiment, a first end portion 510 of the first pin protection layer 51 and a second end portion 520 of the second pin protection layer 52 can be respectively disposed inside the first through hole 4001 and the second through hole 4002 of the bottom seat plate 4. That is to say, the lengths of the first pin protection layer 51 and the second pin protection layer 52 provided by the second embodiment are respectively greater than the lengths of the first pin protection layer 51 and the second pin protection layer 52 provided by the first embodiment, so that the second embodiment can provide a larger protection area for the first exposed portion 212 of the first conductive pin 21 and the second exposed portion 222 of the second conductive pin 22.

It should be noted that the first end portion 510 of the first pin protection layer 51 and the second end portion 520 of the second pin protection layer 52 can also be tightly fitted inside the first through hole 4001 and the second through hole 4002 of the bottom seat plate 4. However, the aforementioned details are disclosed for exemplary purposes only, and are not meant to limit the scope of the present disclosure.

Third Embodiment

Figure 6:
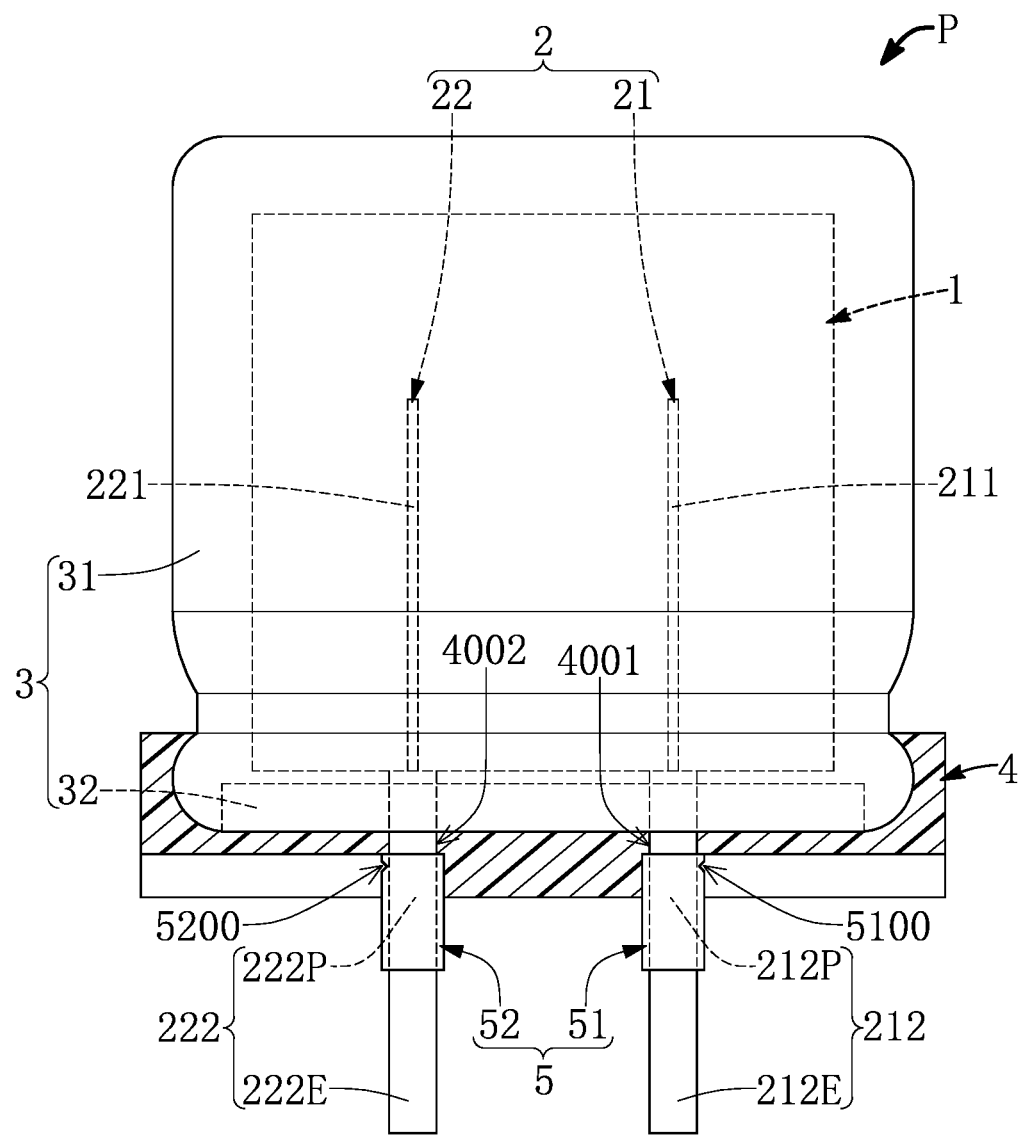
FIG. 6 is a partial schematic cross-sectional view of the wound capacitor package structure provided by a third embodiment of the present disclosure (when the first exposed portion of the first conductive pin and the second exposed portion of the second conductive pin have not been bent)
Figure 7:
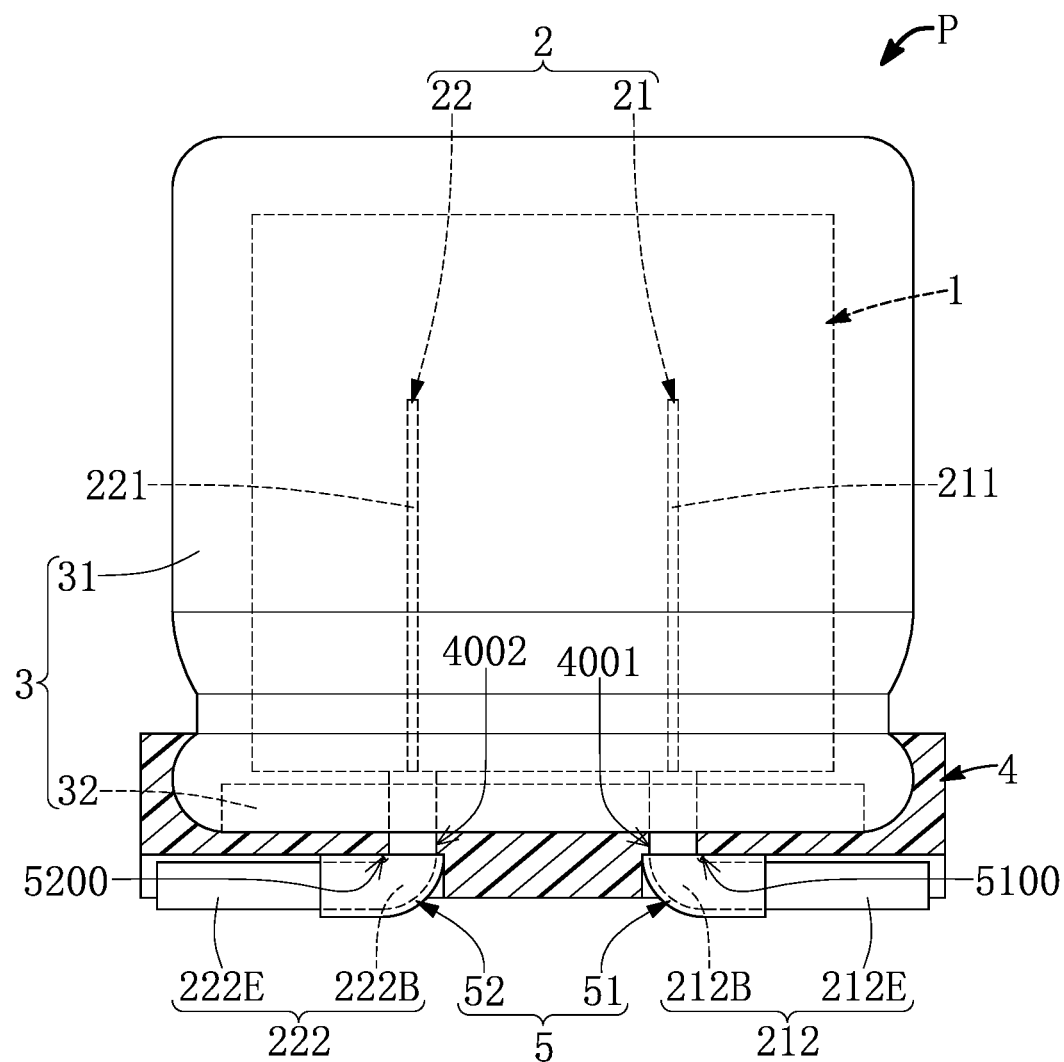
FIG. 7 is a partial schematic cross-sectional view of the wound capacitor package structure provided by the third embodiment of the present disclosure (after the first exposed portion of the first conductive pin and the second exposed portion of the second conductive pin have been bent)

Referring to FIG. 6 and FIG. 7, a third embodiment of the present disclosure provides a wound capacitor package structure P, which includes a wound assembly 1, a conductive assembly 2, a package assembly 3, a bottom seat plate 4 and a pin protection assembly 5. Comparing FIG. 6 with FIG. 2, and comparing FIG. 6 with FIG. 3, the main difference between the third embodiment and the first embodiment is as follows: in the third embodiment, as shown in FIG. 6, before the first conductive pin 21 and the second conductive pin 22 are bent, the first pin protection layer 51 has a first opening 5100 for partially exposing the first prepared bending section 212P of the first exposed portion 212, and the second pin protection layer 52 has a second opening 5200 for partially exposing the second prepared bending section 222P of the second exposed portion 222. Therefore, as shown in FIG. 7, when the first conductive pin 21 and the second conductive pin 22 are bent (that is to say, when the first pin protection layer 51 and the second pin protection layer 52 are bent), the first pin protection layer 51 and the second pin protection layer 52 will not produce wrinkles at the bending positions (i.e., the first bending section 212B and the second bending section 222B), so that the first conductive pin 21 and the second conductive pin 22 can be bent more smoothly to form the first bending section 212B and the second bending section 222B, respectively.

It should be noted that the first opening 5100 of the first pin protection layer 51 and the second opening 5200 of the second pin protection layer 52 provided in the third embodiment can also be applied in other embodiments.

Fourth Embodiment

Figure 8:
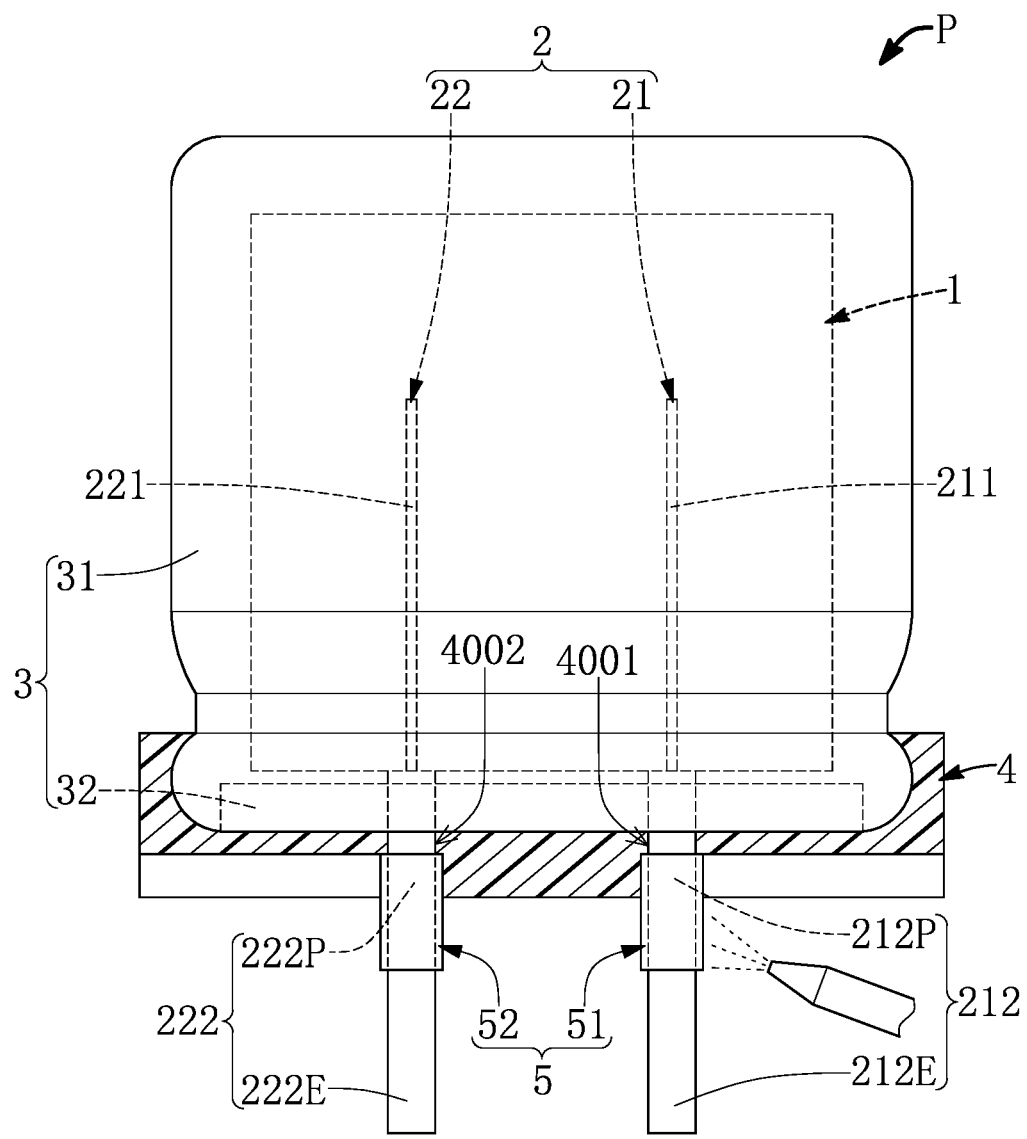
FIG. 8 is a partial schematic cross-sectional view of the wound capacitor package structure provided by a fourth embodiment of the present disclosure (when the first exposed portion of the first conductive pin and the second exposed portion of the second conductive pin have not been bent)
Figure 9:
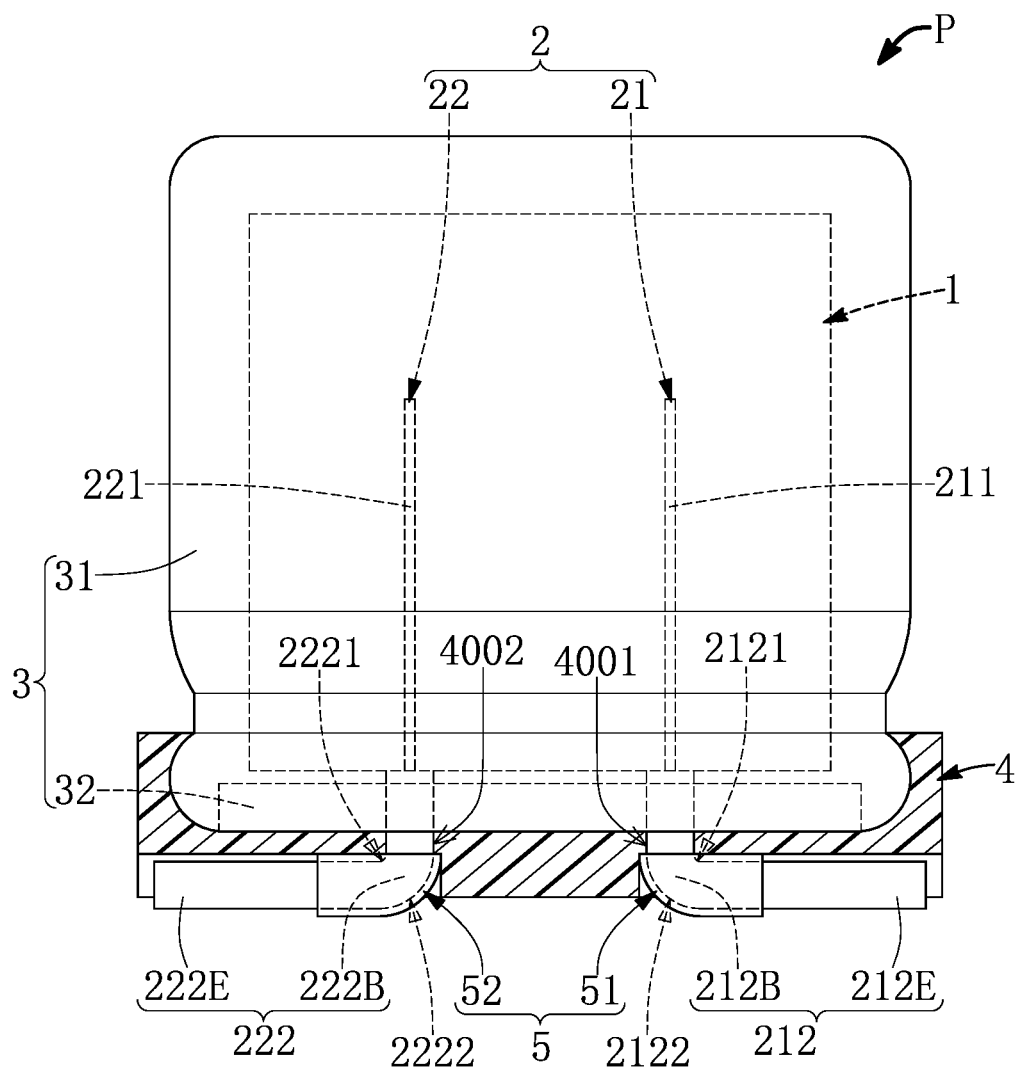
FIG. 9 is a partial schematic cross-sectional view of the wound capacitor package structure provided by the fourth embodiment of the present disclosure (after the first exposed portion of the first conductive pin and the second exposed portion of the second conductive pin have been bent)

Referring to FIG. 8 and FIG. 9, a fourth embodiment of the present disclosure provides a wound capacitor package structure P, which includes a wound assembly 1, a conductive assembly 2, a package assembly 3, a bottom seat plate 4 and a pin protection assembly 5. Comparing FIG. 8 with FIG. 2, and comparing FIG. 9 with FIG. 3, the main difference between the fourth embodiment and the first embodiment is as follows: in the fourth embodiment, as shown in FIG. 8, before the first conductive pin 21 and the second conductive pin 22 are bent, the first pin protection layer 51 and the second pin protection layer 52 can be respectively formed on the first prepared bending section 212P of the first exposed portion 212 of the first conductive pin 21 and the second prepared bending section 222P of the second exposed portion 222 of the second conductive pin 22 through subsequent processing (such as spraying, coating or any other forming method). Therefore, the first pin protection layer 51 can be a first post-production spraying layer, a first post-production coating layer or any first post-production protection layer (that is to say, the first pin protection layer 51 may be a first non-detachable heat-resistant elastic layer) formed on the first exposed portion 212 of the first conductive pin 21 through subsequent processing, and the second pin protection layer 52 can be a second post-production spraying layer, a second post-production coating layer or any second post-production protection layer (that is to say, the second pin protection layer 52 may be a second non-detachable heat-resistant elastic layer) formed on the second exposed portion 222 of the second conductive pin 22 through subsequent processing.

More particularly, as shown in FIG. 9, when the first exposed portion 212 of the first conductive pin 21 is bent to form a first bending section 212B and a first extending section 212E connected to the first bending section 212B, an upper side region and a lower side region of the first bending section 212B of the first exposed portion 212 of the first conductive pin 21 respectively form a first upper bending surface 2121 and a first lower bending surface 2122, and the first pin protection layer 51 can be configured to cover the first upper bending surface 2121 and the first lower bending surface 2122 of the first bending section 212B, so that the first bending section 212B of the first exposed portion 212 of the first conductive pin 21 can be protected by the first pin protection layer 51 to avoid breakage or crack. Moreover, when the second exposed portion 222 of the second conductive pin 22 is bent to form a second bending section 222B and a second extending section 222E connected to the second bending section 222B, an upper side region and a lower side region of the second bending section 222B of the second exposed portion 222 of the second conductive pin 22 respectively form a second upper bending surface 2221 and a second lower bending surface 2222, and the second pin protection layer 52 can be configured to cover the second upper bending surface 2221 and the second lower bending surface 2222 of the second bending section 222B, so that the second bending section 222B of the second exposed portion 222 of the second conductive pin 22 can be protected by the second pin protection layer 52 to avoid breakage or crack.

It should be noted that before bending the first conductive pin 21 and the second conductive pin 22, the first pin protection layer 51 has a first opening (not shown) for partially exposing the first exposed portion 212, and the second pin protection layer 52 has a second opening (not shown) for partially exposing the second exposed portion 222. However, the aforementioned details are disclosed for exemplary purposes only, and are not meant to limit the scope of the present disclosure.

Fifth Embodiment

Figure 10:
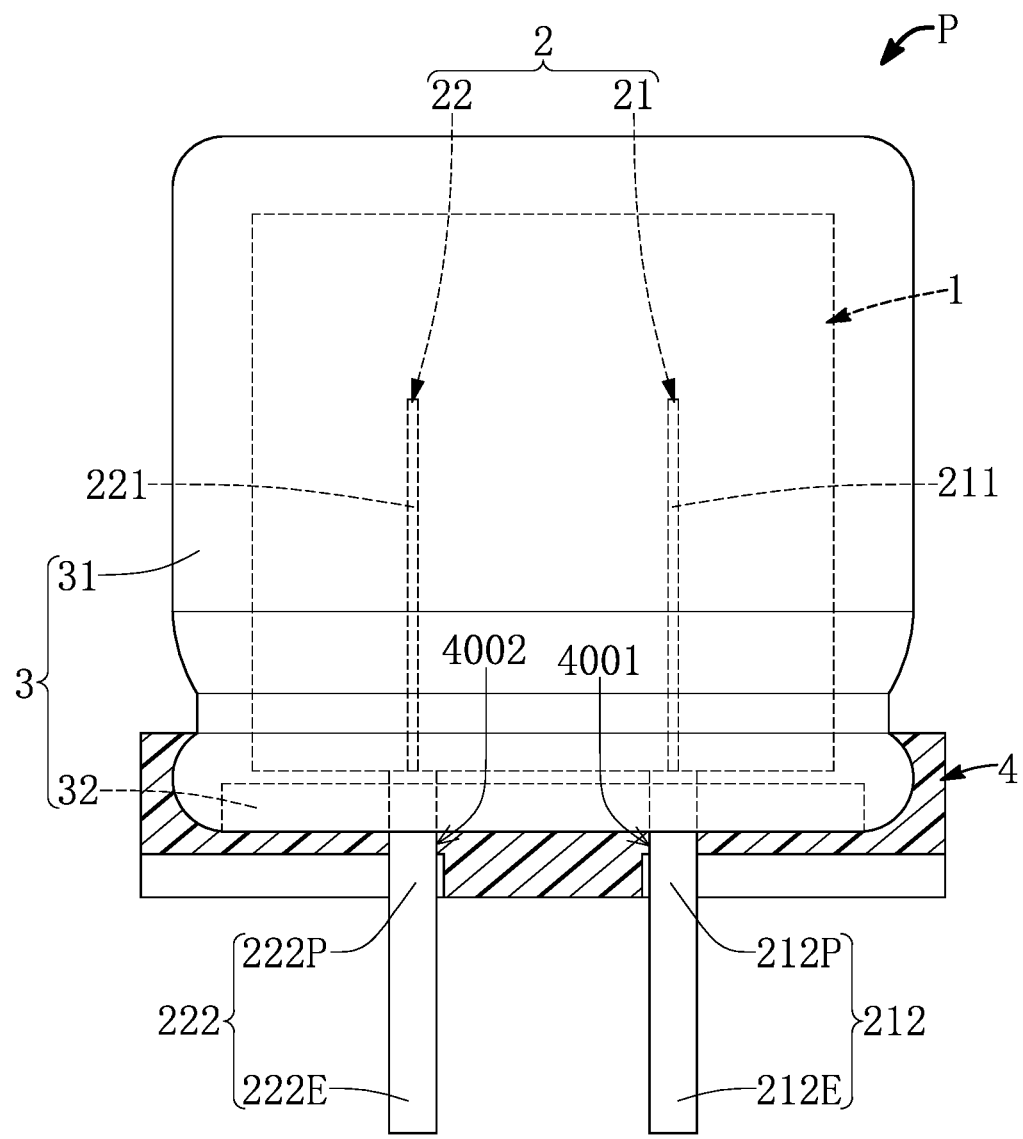
FIG. 10 is a partial schematic cross-sectional view of the wound capacitor package structure provided by a fifth embodiment of the present disclosure (when the first exposed portion of the first conductive pin and the second exposed portion of the second conductive pin have not been bent)
Figure 11:
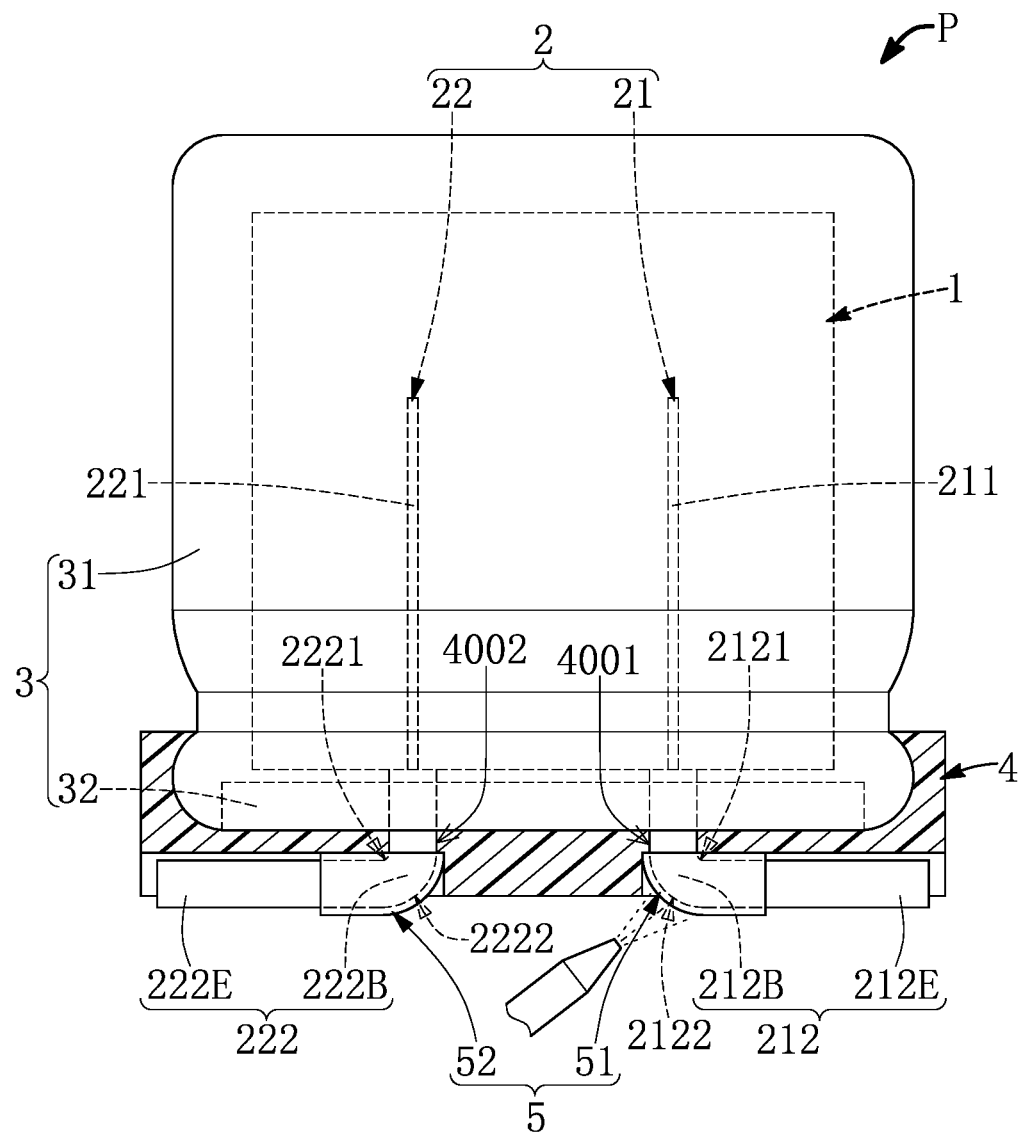
FIG. 11 is a partial schematic cross-sectional view of the wound capacitor package structure provided by the fifth embodiment of the present disclosure (after the first exposed portion of the first conductive pin and the second exposed portion of the second conductive pin have been bent).

Referring to FIG. 10 and FIG. 11, a fifth embodiment of the present disclosure provides a wound capacitor package structure P, which includes a wound assembly 1, a conductive assembly 2, a package assembly 3, a bottom seat plate 4 and a pin protection assembly 5. Comparing FIG. 10 with FIG. 2, and comparing FIG. 11 with FIG. 3, the main difference between the fifth embodiment and the first embodiment is as follows: in the fifth embodiment, as shown in FIG. 11, after the first conductive pin 21 and the second conductive pin 22 are bent, the first pin protection layer 51 and the second pin protection layer 52 can be respectively formed on the first bending section 212B of the first exposed portion 212 of the first conductive pin 21 and the second bending section 222B of the second exposed portion 222 of the second conductive pin 22 through subsequent processing (such as spraying, coating or any other forming method). Therefore, the first pin protection layer 51 can be a first post-production spraying layer, a first post-production coating layer or any first post-production protection layer (that is to say, the first pin protection layer 51 may be a first non-detachable heat-resistant elastic layer) formed on the first exposed portion 212 of the first conductive pin 21 through subsequent processing, and the second pin protection layer 52 can be a second post-production spraying layer, a second post-production coating layer or any second post-production protection layer (that is to say, the second pin protection layer 52 may be a second non-detachable heat-resistant elastic layer) formed on the second exposed portion 222 of the second conductive pin 22 through subsequent processing.

More particularly, as shown in FIG. 9, when the first exposed portion 212 of the first conductive pin 21 is bent to form a first bending section 212B and a first extending section 212E connected to the first bending section 212B, an upper side region and a lower side region of the first bending section 212B of the first exposed portion 212 of the first conductive pin 21 respectively form a first upper bending surface 2121 and a first lower bending surface 2122, and the first pin protection layer 51 can be configured to cover the first upper bending surface 2121 and the first lower bending surface 2122 of the first bending section 212B, so that the first bending section 212B of the first exposed portion 212 of the first conductive pin 21 can be protected by the first pin protection layer 51 to avoid breakage or crack. Moreover, when the second exposed portion 222 of the second conductive pin 22 is bent to form a second bending section 222B and a second extending section 222E connected to the second bending section 222B, an upper side region and a lower side region of the second bending section 222B of the second exposed portion 222 of the second conductive pin 22 respectively form a second upper bending surface 2221 and a second lower bending surface 2222, and the second pin protection layer 52 can be configured to cover the second upper bending surface 2221 and the second lower bending surface 2222 of the second bending section 222B, so that the second bending section 222B of the second exposed portion 222 of the second conductive pin 22 can be protected by the second pin protection layer 52 to avoid breakage or crack.

It should be noted that before bending the first conductive pin 21 and the second conductive pin 22, the first pin protection layer 51 has a first opening (not shown) for partially exposing the first exposed portion 212, and the second pin protection layer 52 has a second opening (not shown) for partially exposing the second exposed portion 222. However, the aforementioned details are disclosed for exemplary purposes only, and are not meant to limit the scope of the present disclosure.

BENEFICIAL EFFECTS OF THE EMBODIMENTS

In conclusion, in the wound capacitor package structure P provided by the present disclosure, by virtue of "the pin protection assembly 5 including a first pin protection layer 51 configured to cover a portion of the first conductive pin 21, and a second pin protection layer 52 configured to cover a portion of the second conductive pin 22" and "the first pin protection layer 51 and the second pin protection layer 52 being respectively disposed on the first exposed portion 212 of the first conductive pin 21 and the second exposed portion 222 of the second conductive pin 22," the first pin protection layer 51 and the second pin protection layer 52 can be configured to respectively protect the first exposed portion 212 of the first conductive pin 21 and the second exposed portion 222 of the second conductive pin 22, so as to prevent the first conductive pin 21 and the second conductive pin 22 from breaking or cracking during the bending process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wound capacitor package structure, comprising:
   a wound assembly including a wound positive conductive foil, a wound negative conductive foil and two wound insulating separators;
   a conductive assembly including a first conductive pin electrically contacting the wound positive conductive foil and a second conductive pin electrically contacting the wound negative conductive foil;
   a package assembly configured for enclosing the wound assembly;
   a bottom seat plate disposed on a bottom side of the package assembly for carrying the package assembly; and
   a pin protection assembly including a first pin protection layer configured to cover a portion of the first conductive pin, and a second pin protection layer configured to cover a portion of the second conductive pin;
   wherein one of the two wound insulating separators is disposed between the wound positive conductive foil and the wound negative conductive foil, and one of the wound positive conductive foil and the wound negative conductive foil is disposed between the two wound insulating separators;
   wherein the first conductive pin includes a first embedded portion accommodated inside the package assembly and a first exposed portion exposed outside the package assembly, and the second conductive pin includes a second embedded portion accommodated inside the package assembly and a second exposed portion exposed outside the package assembly;
   wherein the first exposed portion of the first conductive pin and the second exposed portion of the second conductive pin are exposed from the bottom seat plate, and the first pin protection layer and the second pin protection layer are respectively disposed on the first exposed portion of the first conductive pin and the second exposed portion of the second conductive pin;

wherein, when the first exposed portion of the first conductive pin is bent to form a first bending section and a first extending section connected to the first bending section, the first pin protection layer is configured to surround and cover the first bending section of the first exposed portion of the first conductive pin;

wherein, when the second exposed portion of the second conductive pin is bent to form a second bending section and a second extending section connected to the second bending section, the second pin protection layer is configured to surround and cover the second bending section of the second exposed portion of the second conductive pin.

2. The wound capacitor package structure according to claim 1, wherein the package assembly includes a package casing configured to accommodate the wound assembly and a bottom sealing structure disposed inside the package casing for cooperating with the package casing, and the wound assembly is completely enclosed by the package casing and the bottom sealing structure;

wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;

wherein the first bending section of the first exposed portion of the first conductive pin is protected by the first pin protection layer to avoid breakage or crack;

wherein the second bending section of the second exposed portion of the second conductive pin is protected by the second pin protection layer to avoid breakage or crack;

wherein the first pin protection layer is a first post-production spraying layer or a first post-production coating layer, and the second pin protection layer is a second post-production spraying layer or a second post-production coating layer;

wherein the first pin protection layer has a first opening for partially exposing the first bending section of the first exposed portion, and the second pin protection layer has a second opening for partially exposing the second bending section of the second exposed portion.

3. The wound capacitor package structure according to claim 1, wherein the package assembly includes a package casing configured to accommodate the wound assembly and a bottom sealing structure disposed inside the package casing for cooperating with the package casing, and the wound assembly is completely enclosed by the package casing and the bottom sealing structure;

wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;

wherein, when the first exposed portion of the first conductive pin is bent to form the first bending section and the first extending section connected to the first bending section, an upper side region and a lower side region of the first bending section of the first exposed portion of the first conductive pin respectively form a first upper bending surface and a first lower bending surface, and the first pin protection layer is configured to cover the first upper bending surface and the first lower bending surface of the first bending section, so that the first bending section of the first exposed portion of the first conductive pin is protected by the first pin protection layer to avoid breakage or crack;

wherein, when the second exposed portion of the second conductive pin is bent to form the second bending section and the second extending section connected to the second bending section, an upper side region and a lower side region of the second bending section of the second exposed portion of the second conductive pin respectively form a second upper bending surface and a second lower bending surface, and the second pin protection layer is configured to cover the second upper bending surface and the second lower bending surface of the second bending section, so that the second bending section of the second exposed portion of the second conductive pin is protected by the second pin protection layer to avoid breakage or crack;

wherein the first pin protection layer is a first post-production spraying layer or a first post-production coating layer, and the second pin protection layer is a second post-production spraying layer or a second post-production coating layer.

4. The wound capacitor package structure according to claim 1, wherein the package assembly includes a package casing configured to accommodate the wound assembly and a bottom sealing structure disposed inside the package casing for cooperating with the package casing, and the wound assembly is completely enclosed by the package casing and the bottom sealing structure;

wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;

wherein the first pin protection layer is a first post-production spraying layer, a first post-production coating layer, a first prefabricated attachment layer or a first detachable heat-resistant elastic sleeve, and the second pin protection layer is a second post-production spraying layer, a second post-production coating layer, a second prefabricated attachment layer or a second detachable heat-resistant elastic sleeve.

5. The wound capacitor package structure according to claim 1, wherein the package assembly includes a package casing configured to accommodate the wound assembly and a bottom sealing structure disposed inside the package casing for cooperating with the package casing, and the wound assembly is completely enclosed by the package casing and the bottom sealing structure;

wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;

wherein the first pin protection layer is a first non-detachable heat-resistant elastic layer or a first detachable heat-resistant elastic sleeve, and the second pin protection layer is a second non-detachable heat-resistant elastic layer or a second detachable heat-resistant elastic sleeve;

wherein the first pin protection layer has a first opening for partially exposing the first exposed portion, and the second pin protection layer has a second opening for partially exposing the second exposed portion.

6. A wound capacitor package structure, comprising:
a wound assembly;
a conductive assembly including a first conductive pin and a second conductive pin;
a package assembly configured for enclosing the wound assembly;
a bottom seat plate disposed on a bottom side of the package assembly; and
a pin protection assembly including a first pin protection layer configured to cover a portion of the first conductive pin, and a second pin protection layer configured to cover a portion of the second conductive pin;
wherein the first conductive pin includes a first exposed portion exposed outside the package assembly, and the second conductive pin includes a second exposed portion exposed outside the package assembly;
wherein the first exposed portion of the first conductive pin and the second exposed portion of the second conductive pin are exposed from the bottom seat plate, and the first pin protection layer and the second pin protection layer are respectively disposed on the first exposed portion of the first conductive pin and the second exposed portion of the second conductive pin;
wherein, when the first exposed portion of the first conductive pin is bent to form a first bending section and a first extending section connected to the first bending section, the first pin protection layer is configured to surround and cover the first bending section of the first exposed portion of the first conductive pin;
wherein, when the second exposed portion of the second conductive pin is bent to form a second bending section and a second extending section connected to the second bending section, the second pin protection layer is configured to surround and cover the second bending section of the second exposed portion of the second conductive pin.

7. The wound capacitor package structure according to claim 6,
wherein the package assembly includes a package casing configured to accommodate the wound assembly and a bottom sealing structure disposed inside the package casing for cooperating with the package casing, and the wound assembly is completely enclosed by the package casing and the bottom sealing structure;
wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;
wherein the first bending section of the first exposed portion of the first conductive pin is protected by the first pin protection layer to avoid breakage or crack;
wherein the second bending section of the second exposed portion of the second conductive pin is protected by the second pin protection layer to avoid breakage or crack;
wherein the first pin protection layer is a first post-production spraying layer or a first post-production coating layer, and the second pin protection layer is a second post-production spraying layer or a second post-production coating layer;
wherein the first pin protection layer has a first opening for partially exposing the first bending section of the first exposed portion, and the second pin protection layer has a second opening for partially exposing the second bending section of the second exposed portion.

8. The wound capacitor package structure according to claim 6,
wherein the package assembly includes a package casing configured to accommodate the wound assembly and a bottom sealing structure disposed inside the package casing for cooperating with the package casing, and the wound assembly is completely enclosed by the package casing and the bottom sealing structure;
wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;
wherein, when the first exposed portion of the first conductive pin is bent to form the first bending section and the first extending section connected to the first bending section, an upper side region and a lower side region of the first bending section of the first exposed portion of the first conductive pin respectively form a first upper bending surface and a first lower bending surface, and the first pin protection layer is configured to cover the first upper bending surface and the first lower bending surface of the first bending section, so that the first bending section of the first exposed portion of the first conductive pin is protected by the first pin protection layer to avoid breakage or crack;
wherein, when the second exposed portion of the second conductive pin is bent to form the second bending section and the second extending section connected to the second bending section, an upper side region and a lower side region of the second bending section of the second exposed portion of the second conductive pin respectively form a second upper bending surface and a second lower bending surface, and the second pin protection layer is configured to cover the second upper bending surface and the second lower bending surface of the second bending section, so that the second bending section of the second exposed portion of the second conductive pin is protected by the second pin protection layer to avoid breakage or crack;
wherein the first pin protection layer is a first post-production spraying layer or a first post-production coating layer, and the second pin protection layer is a second post-production spraying layer or a second post-production coating layer.

9. The wound capacitor package structure according to claim 6,
wherein the package assembly includes a package casing configured to accommodate the wound assembly and a bottom sealing structure disposed inside the package casing for cooperating with the package casing, and the wound assembly is completely enclosed by the package casing and the bottom sealing structure;
wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;
wherein the first pin protection layer is a first post-production spraying layer, a first post-production coating layer, a first prefabricated attachment layer or a first detachable heat-resistant elastic sleeve, and the second pin protection layer is a second post-production spraying layer, a second post-production coating layer, a second prefabricated attachment layer or a second detachable heat-resistant elastic sleeve.

10. The wound capacitor package structure according to claim 6,
wherein the package assembly includes a package casing configured to accommodate the wound assembly and a bottom sealing structure disposed inside the package casing for cooperating with the package casing, and the wound assembly is completely enclosed by the package casing and the bottom sealing structure;
wherein the bottom seat plate has a first through hole and a second through hole, the first conductive pin and the second conductive pin respectively pass through the first through hole and the second through hole of the bottom seat plate, and a first end portion of the first pin protection layer and a second end portion of the second pin protection layer are respectively disposed inside the first through hole and the second through hole of the bottom seat plate;
wherein the first pin protection layer is a first non-detachable heat-resistant elastic layer or a first detachable heat-resistant elastic sleeve, and the second pin protection layer is a second non-detachable heat-resistant elastic layer or a second detachable heat-resistant elastic sleeve;
wherein the first pin protection layer has a first opening for partially exposing the first exposed portion, and the second pin protection layer has a second opening for partially exposing the second exposed portion.

* * * * *